United States Patent [19]

Koumoto et al.

[11] Patent Number: 5,124,910

[45] Date of Patent: Jun. 23, 1992

[54] MICROPROGRAM CONTROL APPARATUS FOR GENERATING A BRANCH CONDITION SIGNAL TO BE DESIGNATED BY A MICRO-BRANCH INSTRUCTION

[75] Inventors: Yasuhiko Koumoto; Kei Tokunaga, both of Tokyo, Japan

[73] Assignee: NEC Corporation, Tokyo, Japan

[21] Appl. No.: 475,487

[22] Filed: Feb. 7, 1990

[30] Foreign Application Priority Data

Feb. 9, 1989 [JP] Japan .................................. 1-31459

[51] Int. Cl.⁵ .......................... G06F 9/22; G06F 9/26; G06F 9/32
[52] U.S. Cl. .................................. 395/375; 364/262.4; 364/262.8; 364/263.1; 364/261.7; 364/261.3; 364/261.5; 364/DIG. 1
[58] Field of Search ... 364/200 MS File, 900 MS File

[56] References Cited

U.S. PATENT DOCUMENTS

| | | | |
|---|---|---|---|
| 4,398,243 | 8/1983 | Holberger et al. | 364/200 |
| 4,685,058 | 8/1987 | Lee et al. | 364/200 |
| 4,760,519 | 7/1988 | Papworth et al. | 364/200 |
| 4,777,594 | 10/1988 | Jones et al. | 364/200 |

Primary Examiner—Thomas C. Lee
Assistant Examiner—Daniel Pan
Attorney, Agent, or Firm—Foley & Lardner

[57] ABSTRACT

A plurality of first selectors are connected to a branch condition taken/non-taken decision circuit, and a second selector is connected to the first selector. Among branch condition taken/non-taken signals, at least one signal is common to the first selectors. Consequently, the step number of microinstruction to realize a macroinstructions is decreased, and the executing time of the macroinstruction is shortened.

8 Claims, 3 Drawing Sheets

MICROPROGRAM CONTROL APPARATUS FOR GENERATING A BRANCH CONDITION SIGNAL TO BE DESIGNATED BY A MICRO-BRANCH INSTRUCTION

FIELD OF THE INVENTION

The invention relates to a microprogram control apparatus, and more particularly, to a control apparatus for controlling a conditional branch instruction of a microprogram.

BACKGROUND OF THE INVENTION

A conventional microprogram control apparatus comprises a program memory for storing instructions which are programmed by a user and read out as a macroinstruction, a microinstruction memory for storing a series of microinstructions corresponding to each macroinstruction, and a microprogram control unit for controlling the execution of microinstructions.

In operation, an addressed instruction of the program memory is read out as a macroinstruction, and a series of microinstructions corresponding to the read-out macroinstruction are sequentially read out from the microinstruction memory in accordance with address information contained in the read-out macroinstruction.

In general, a conditional branch instruction (hereinafter "micro-branch instruction") is prepared among microinstructions, and a branch condition of the micro-branch instruction is generated by decoding the value and state of internal resources in the microprogram control apparatus. In realizing a read-out macroinstruction in the form of microinstructions corresponding to the read-out macroinstruction, it is necessary to refer to the value and state of a specified internal resource in the microprogram control unit in accordance with a function of the macroinstruction. Therefore, micro-branch conditions of kinds which are required in number to realize macroinstructions supplied by the microprogram control unit must be prepared, so that micro-branch instructions of the same kinds as the micro-branch conditions are prepared.

In this point, a word length of microinstructions which are stored in a microinstruction memory is limited. For this reason, preparing micro-branch instructions of the kind which are greater in number than micro-branch instructions to be identified by the word length is impossible. The word length of the microinstructions is dependent on a hardware limitation of the microprogram control unit. Therefore, it is impossible to increase the word length sufficiently to identify the required number of the micro-branch instructions. In fact, a limited portion of the word length of the micro-branch instructions can be used for information of the branch condition, because a word of the micro-branch instruction includes not only the branch condition, but also an opcode, a branch destination address information, etc. In the following explanation, the portion, to which the branch condition information is assigned, is defined as a micro-branch instruction identifying field.

Accordingly, another conventional microprogram control apparatus is proposed to realize micro-branch instructions the kind which are greater in number than the micro-branch instructions to be identified by the micro-branch instruction identifying field, wherein a bank selecting register, into which an exclusive microinstruction is set, is provided to designate one of a plurality of micro-branch condition banks. Each of the micro-branch condition banks includes a predetermined number of micro-branch conditions, into which whole micro-branch conditions are divided by the number of the micro-branch condition banks.

In operation, the exclusive microinstruction is set in the bank selecting register, so that one of the micro-branch condition banks is designated by the content of the bank selecting register. In the designated micro-branch condition bank, one of the micro-branch conditions is selected by the content of the micro-branch instruction identifying field.

However, there are disadvantages in a microprocessor for the microprogram control system. In particular, highly advanced instructions such as a privilege instruction, a letter-train transferring instruction, etc., in addition to fundamental instructions such as an arithmetic and logic instruction, a transferring instruction, etc., must be executed. For this purpose, a microprogram having a complicated algorithm, in which a number of micro-branch conditions are required, must be described in the microprocessor. Only one micro-branch condition contained in one micro-branch condition bank can be identified by the content of a micro-branch instruction identifying field. This means that the plural micro-branch condition banks are frequently designated one by one, because a number of micro-branch conditions are required. Such a switching-over in the designation of the micro-branch condition bank requires the bank selecting register to be renewed in its content in accordance with the execution of microinstructions. As a result, the number of steps required to execute microinstruction is increased, so that the processing speed of a macroinstruction, which is realized by a series of microinstructions, is lowered, thereby resulting in the degradation of a performance in the microprogram control apparatus.

SUMMARY OF THE INVENTION

Accordingly, it is an object of this invention to provide a microprogram control apparatus, in which the processing speed of a macroinstruction is increased.

It is a further objective of this invention to provide a microprogram control apparatus, in which a number of micro-branch conditions can be dealt, without increasing the number of steps required to execute a microprogram.

According to this invention, a microprogram control apparatus, comprises:

a plurality of first selectors each having a plurality of input nodes for receiving a plurality of branch condition taken/non-taken signals and an output node for supplying a signal selected from the branch condition taken/non-taken signals;

a second selector having a plurality of input nodes for receiving the selected signals from the first selectors and an output node for supplying a signal selected from the selected signals; and means for setting a selecting signal, the first selectors and the second selector being controlled in the signal selection by the selecting signal;

wherein at least one branch condition taken/non-taken signal is common among the branch condition taken/non-taken signals to the first selectors; and the selected signal of the second selector is a branch condition taken/non-taken signal which is designated by a micro-branch instruction.

BRIEF DESCRIPTION OF THE DRAWINGS

This invention will be explained in more detail in conjunction with appended drawings, wherein.

DESCRIPTION OF THE PREFERRED EMBODIMENTS

Figure 1:
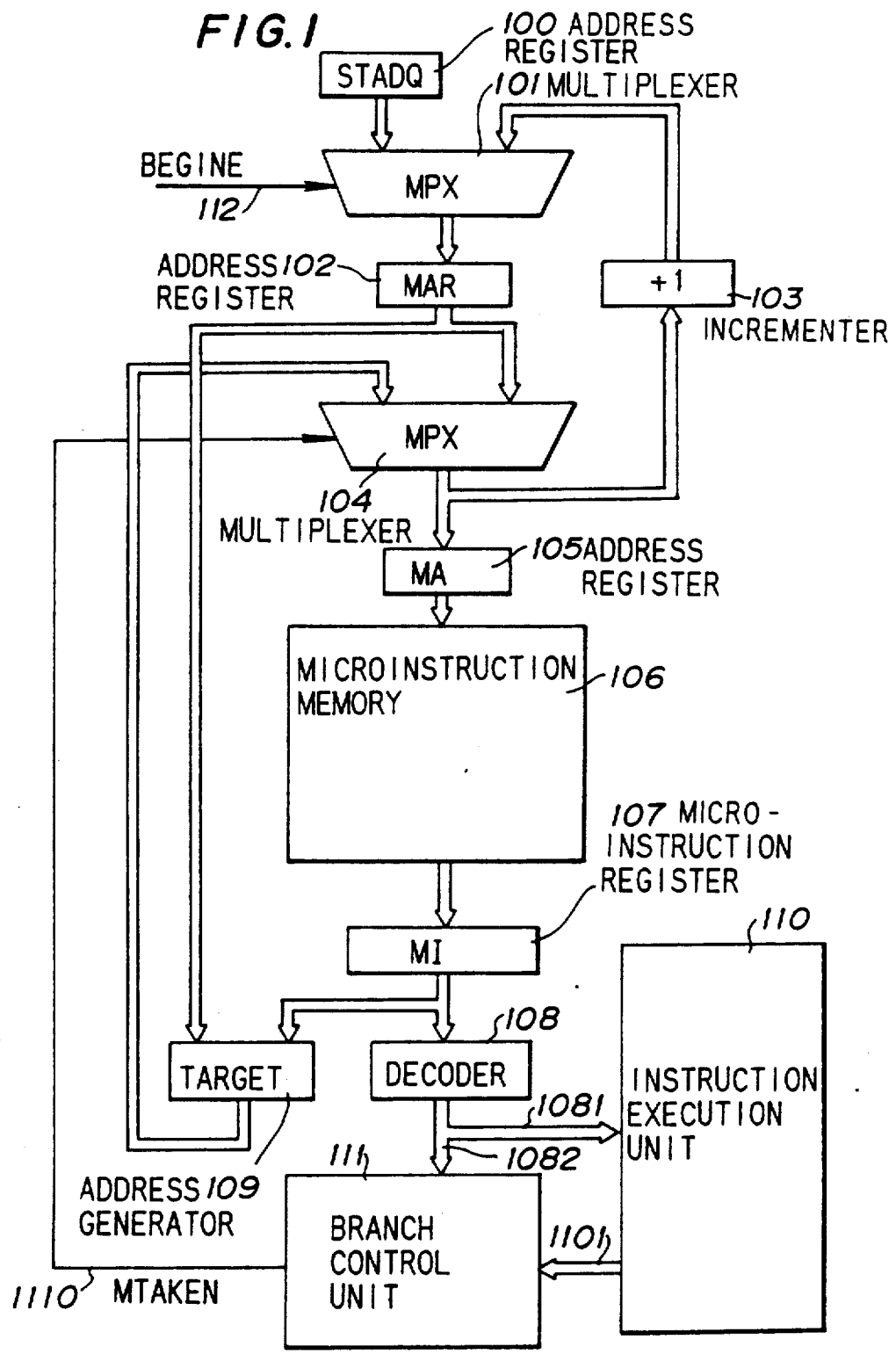
FIG. 1 is a block diagram showing a microprogram control apparatus in a first preferred embodiment according to the invention.

FIG. 1 shows a microprogram control apparatus in the first preferred embodiment which comprises an address register (STADQ) 100, in which the first address of a series of microinstruction corresponding to a macroinstruction is set, an address register (MAR) 102, to which a content of the address register 100 and an output of an incrementer 103 are selectively supplied by a multiplexer 102, an address register (MA) 105, to which a content of the address register 102 and an output of a branch destination address generator (TARGET) 109 are selectively supplied by a multiplexer 104, a microinstruction memory 106 which is accessed by a content of the address register 105, a microinstruction register 107, in which a microinstruction read from the microinstruction memory 106 is set, a decoder 108, in which the microinstruction stored in the microinstruction register 107 is decoded, an instruction execution unit 110, in which a predetermined calculation is carried out in accordance with the decoded results, and a branch control unit 111, from which a taken or non-taken signal of a branch condition is supplied to the multiplexer 104 in accordance with value and state of internal resources in the instruction execution unit 110.

In operation, a macroinstruction is read from a program memory (not shown), and the first address of a series of the microprograms, by which the macroinstruction is realized, is transferred to the address register (STADQ) 100, and is held therein, until the execution of the microprograms finishes. The first address set in the address register 100 is stored through the multiplexer 101 in the address register (MAR) 102 by an execution beginning signal (BEGINE) 112 of microinstructions.

Where the branch condition is taken, the multiplexer 104 selects an output of the branch destination address generator (TARGET) 109, and where the branch condition is not taken, the multiplexer 104 selects an output of the address register 102, wherein the taken and non-taken of the branch condition is notified to the multiplexer 104 by the signal (MTAKEN) 110. The output of the multiplexer 104 is incremented in the incrementer 103 by one (+1), is also stored in the address register 105. In the execution of a series of microprograms for one macroinstruction, the multiplexer 101 selects the output of the incrementer 103. Accordingly, a content of the address register 105 is increased by one, as long as the branch condition is not taken during the execution. The content of the address register 105 is supplied as an address information to the microinstruction memory 106, in which microprograms are stored, and a microinstruction is read therefrom at an address designated by the address register 105. The read-out microinstruction is transferred to the microinstruction register (MI) 107, and is then decoded by the decoder 108. Where the microinstruction is a micro-branch instruction, a branch destination address information contained in the microinstruction is supplied to the branch destination address generator (TARGET) 109, in which a branch destination address is generated to be supplied to the multiplexer 104 by referring to the address information of the address register (MAR) 102, along with the information of the microinstruction register 107. The decoded information of the decoder 108 is supplied through a bus 1081 to the instruction execution unit 110, in which a predetermined calculation is thereby carried out. On the other hand, the conditional branch information of the decoder 108 is supplied through a bus 1082 to the branch control unit 111, in which the branch condition taken/non-taken signal (MTAKEN) 110 is generated in response to the information of the bus 1082 by receiving information indicating value and state of the internal resources in the instruction execution unit 110 through the bus 1101 connecting therebetween.

Figure 2:
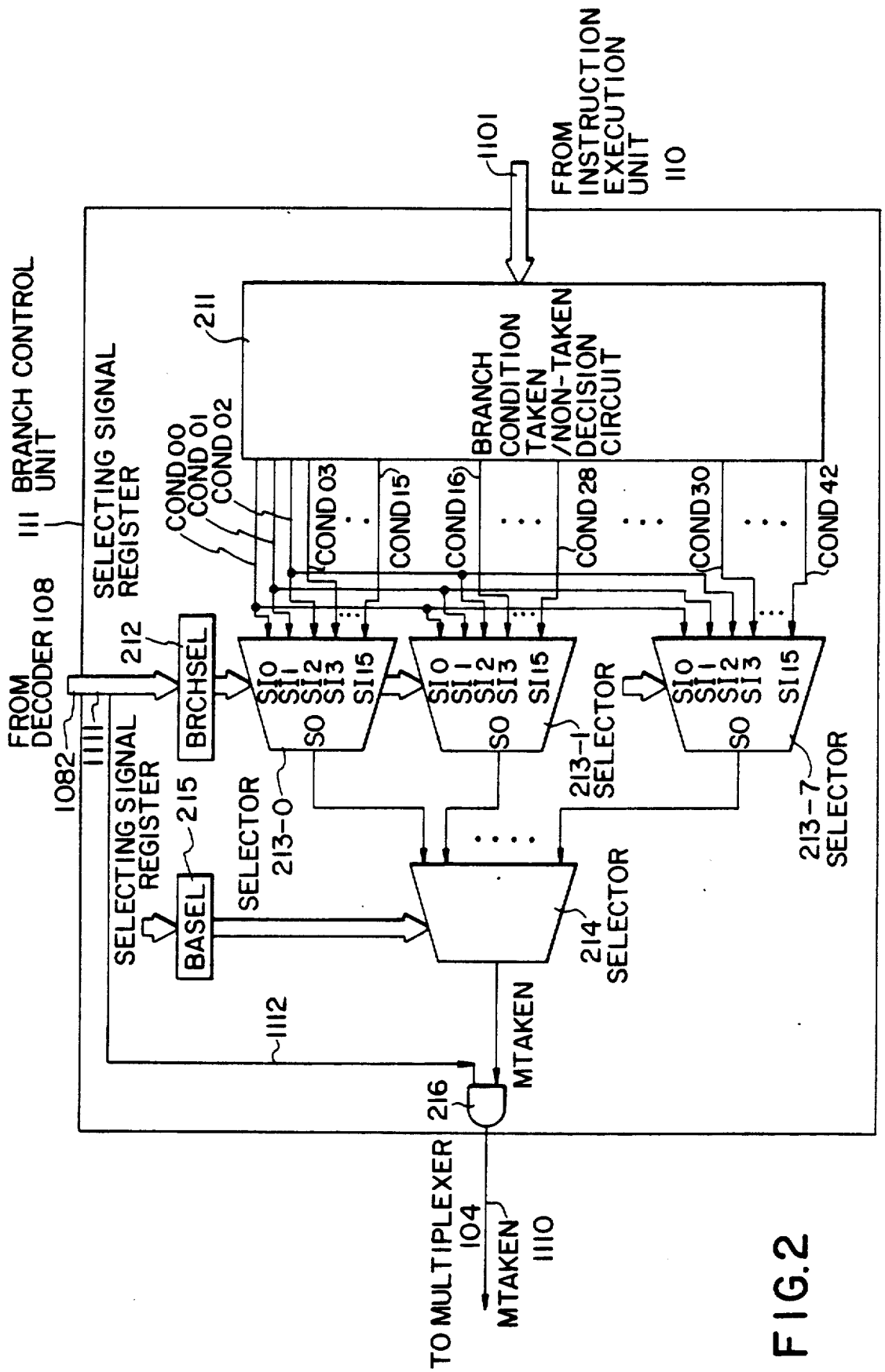
FIG. 2 is a block diagram showing a branch control unit in the first preferred embodiment.

FIG. 2 shows the branch control unit 111 in more detail, wherein it includes a branch condition taken/non-taken decoder 211, eight first selectors 213-0 to 213-7, a second selector 214, two selecting signal registers (BRCHSEL, and BASEL) 212 and 215, and an AND gate 216. In the decoder 211, the information indicating the value and state of the internal resources supplied through the bus 1101 from the instruction execution unit 110 is decoded, so that branch condition taken/non-taken signals COND 00 to COND 42 are generated therein. For instance, the branch condition taken/non-taken signal COND 00 relates to a signal for detecting zero in an arithmetic result which is generated at each time when an arithmetic is carried out in an arithmetic and logic unit (not shown) in the instruction execution unit 110. Where the zero detecting signal is zero, the signal COND 00 becomes an active level to provide the taken of a conditional branch, and where the zero detecting signal is not zero, the signal COND 00 becomes an inactive level to provide the non-taken of the conditional branch. This means that the signal COND 00 is referred in a micro-branch instruction which is executed, thereby resulting in a branch, where the zero detecting signal is zero. In the same manner, the signals COND 01 and COND 02 are referred as branch condition taken/non-taken signals relating to carry and sign detecting signals which are generated at each time when an arithmetic is carried out in the arithmetic and logic unit. The other signals COND 03 to 42 are also referred as branch condition taken/non-taken signals relating, respectively, to other state signals of the arithmetic and logic unit, and to the value and state of the internal resources thereof. As apparent from this explanation, a number of the branch condition taken/non-taken signals are generated in the decoder 211.

On the other hand, the information of the identifying field in the microinstruction, for instance, consisting of four bits to designate sixteen signals is stored through a bus 1111 connected to the bus 1082 from the decoder 108 into the register (BRCHSEL) 212. A content of the register 212 is commonly supplied to the eight first selectors 213-0 to 213-7, so that each of the selectors 213-0 to 213-7 is controlled to receive the branch condition taken/non-taken signal at a selected node from input nodes SI0 to SI15 dependent on the content of the register 212, and to supply the received signal from an output node SO to the second selector 214. In each of the selectors 213-0 to 213-7, the three branch condition taken/non-taken signals COND 00, COND 01, and COND 02 are commonly received at the input nodes SI0 to 2. As described before, the signals COND 00, COND 01 and COND 02 are referred as branch condition taken/non-taken signals relating, respectively, to zero, carry, and sign detecting signals in the arithmetic and logic unit. Therefore, these signals are frequently used as micro-branch conditions. If it is assumed that the four bit information of, for instance, "0000", by which the signal COND 00 is designated, is stored in the register (BRCHSEL) 212, all of the first selectors 213-0 to 213-7 select the signal COND 00 to be supplied from the output node SO to the second selector 214. In the same manner, where the information stored in the register (BRCHSEL) 212 designates the signal COND 01 or COND 02, all of the first selectors 213-0 to 213-7 supplies the signal COND 01 or COND 02 to the second selector 214. The second selector 214 is controlled to select one of the branch condition taken/non-taken signals supplied from the eight first selectors 213-0 to 213-7 dependent on a content of the register (BASEL) 215, in which a three bit information is stored by executing a bank selection microinstruction read from the microinstruction memory 106. An output signal of the selector 214 is a designated branch condition taken/non-taken signal (MTAKEN), which is supplied to the first input terminal of the AND gate 216. To the second input terminal of the AND gate 216, a signal 1112 indicating a micro-branch instruction is supplied through the bus 1082 from the decoder 108. Thus, where an instruction read from the microinstruction memory 106 is a micro-branch instruction, the conditional branch of which is taken, the signal (MTAKENE) 1110 becomes an active level, so that the multiplexer 104 selects the branch destination address to be transferred to the address register (MA) 105.

As understood from the above, the signal (MTAKEN) 1110 is a signal selected from the signals COND 00, COND 01 and COND 02, as long as an executing micro-branch instruction is a branch condition taken/non-taken signal selected from the signals COND 00, COND 01 and COND 02, even if any of the banks is designated by the content of the register (BASEL) 215. Therefore, it is not necessary to execute a bank selection (switching-over) micro instruction. Consequently, the number of required steps is largely decreased, because a branch instruction which refers to the signals COND 00, COND 01, and COND 02 is frequently used. Furthermore, the bit length of an identifying field in a micro-branch instruction is not increased, because the designation of the selectors 213-0 to 213-7, that is, the switching-over of the banks is carried out by the selecting signal register (BASEL) 215 and the second selector 214, although the number of selectors is increased as compared to an apparatus in which all the signals are supplied to a single selector.

Figure 3:
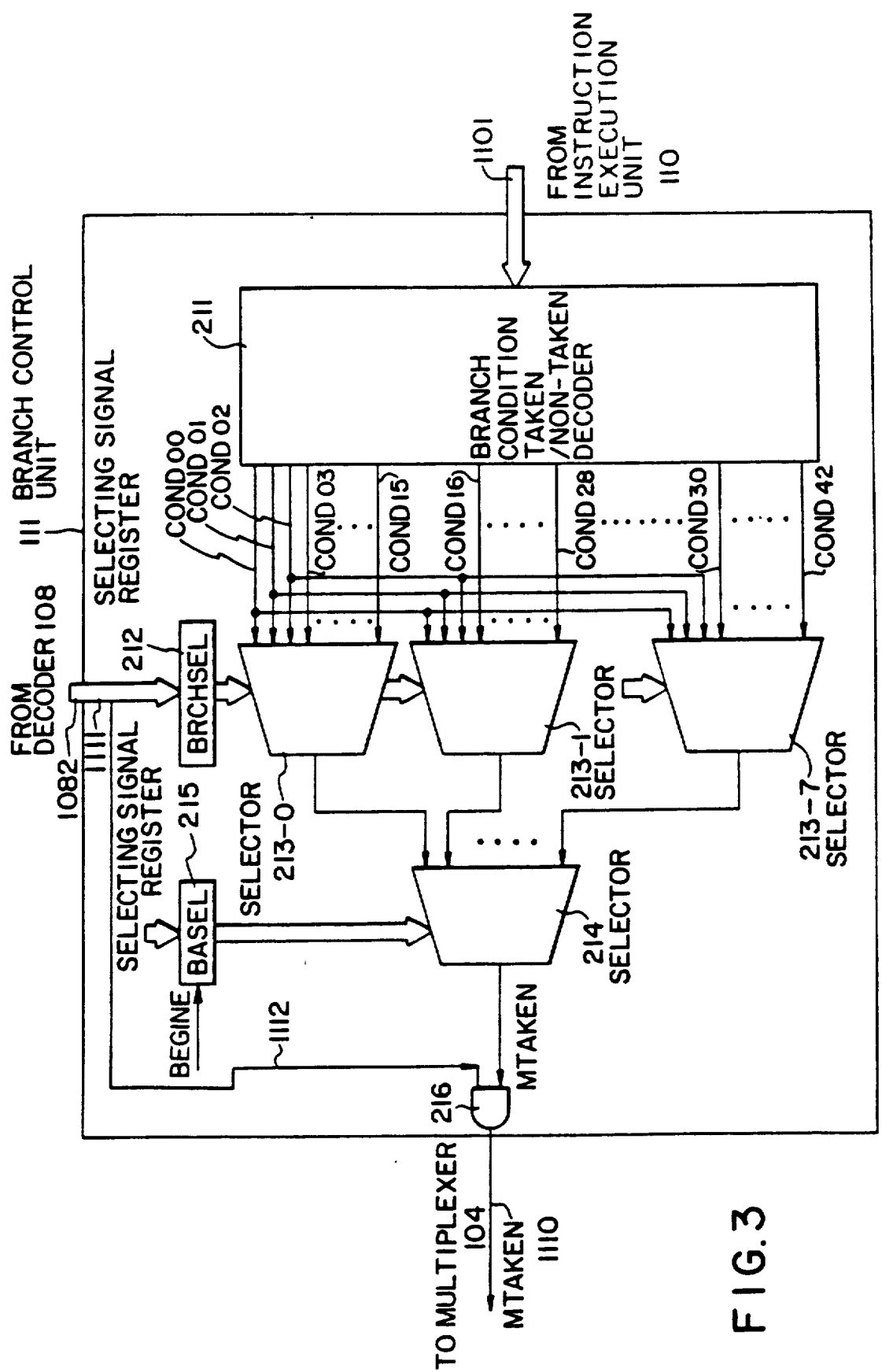
FIG. 3 is a block diagram showing a branch control unit in a microprogram control apparatus in a second preferred embodiment according to the invention.

FIG. 3 shows a branch control unit 111 which is used in a microprogram control apparatus in a second preferred embodiment according to the invention, wherein like ports are indicated by like reference numerals as used in FIG. 2, except that the signal (BEGINE) is supplied to the register (BASEL) 215 which is thereby initialized. In more detail, the register 215 is initialized at the executing beginning time of a series of microinstruction routines for each macroinstruction, thereby designating the bank of the selector 213-0 in accordance with the initialized content of, for instance, "000". Therefore, where micro-branch instructions, which are at the next highest order in referred frequency to those assigned to the signals COND 00 to COND 02, are assigned to the branch condition taken/non-taken signals COND 03 to COND 15, the step number of microprograms is decreased as compared to that in the first preferred embodiment. Furthermore, where the signals COND 03 to COND 15 are used as branch condition taken/non-taken signals for micro-branch instructions to execute a macroinstruction in a category, in which a referred frequency is large as compared to other categories, and into which microinstructions are divided, the same advantage as decreasing the step number is obtained.

As described above, the step number of microinstructions is decreased to realize a macroinstruction, so that the executing time of the macroinstruction is shortened, because at least one branch condition taken/non-taken signal is common to plural micro-branch condition banks.

Although the invention has been described with respect to specific embodiment for complete and clear disclosure, the appended claims are not to be thus limited but are to be construed as embodying all modification and alternative constructions that may occur to one skilled in the art which fairly fall within the basic teaching herein set forth.

What is claimed is:

1. A microprogram control apparatus, comprising:
   a plurality of first selectors each having a plurality of input nodes for receiving a plurality of branch condition taken/non-taken signals and an output node for supplying a first selected signal from said branch condition taken/non-taken signals;
   a second selector having a plurality of input nodes for receiving said first selected signals from said plurality of first selectors and an output node for supplying a second selected signal from said first selected signals; and
   means for setting a selecting signal which controls signal selection of said plurality of first selectors and said second selector;
   wherein at least one branch condition taken/non-taken signal is common among said branch condition taken/non-taken signals supplied to said plurality of first selectors;
   said second selected signal is a branch condition taken/non-taken signal which is designated by a micro-branch instruction; and
   said plurality of first selectors selecting branch condition taken/non-taken signals supplied to input terminals of the same position thereamong in accordance with a content of said selecting signal, so that said branch condition taken/non-taken signals of the same content are supplied from said plurality of first selectors to said second selector, when said selecting signal is a predetermined value, and the same branch condition taken/non-taken signal is supplied from said second selector.

2. A microprogram control apparatus, according to claim 1, wherein:
   said means includes first and second registers; and said selecting signal includes a first selecting signal set in said first register and a second selecting signal set in said second register;
   said first selecting signal set being information of an identifying field in a microinstruction; and said second selecting signal set being designated by the execution of a microinstruction.

3. A microprogram control apparatus, according to claim 1, further comprising:
   a branch condition taken/non-taken decision circuit for supplying said branch condition taken/non-taken signal to said plurality of said first selectors.

4. A microprogram control apparatus, according to claim 3, further comprising:
   a microinstruction memory, in which microprograms are stored, and from which microinstructions are read in accordance with an address selected from an address included in a macroinstruction and a branch destination address;
   a decoder for decoding said microinstructions to provide decoded information including said selecting signal;
   a branch destination address generator for generating said branch destination address in accordance with a branch destination address of said microinstructions and said address of said macroinstruction; and
   an instruction execution unit for carrying out a predetermined calculation in accordance with said decoded information, said instruction execution unit supplying information indicating value and state of each internal resource to said branch condition taken/non-taken decision circuit.

5. A microprogram control apparatus, comprising:
   a plurality of first selectors each having a plurality of input nodes for receiving a plurality of branch condition taken/non-taken signals and an output node for supplying a first selected signal from said branch condition taken/non-taken signals;
   a second selector having a plurality of input nodes for receiving said first selected signals from said plurality of first selectors and an output node for supplying a second selected signal from said first selected signals; and
   means for setting a selected signal which controls signal selection of said plurality of first selectors and said second selector;
   wherein at least one branch condition taken/non-taken signal is common among said branch condition taken/non-taken signals supplied to said plurality of first selectors;
   said second selected signal is a branch condition taken/non-taken signal which is designated by a micro-branch instruction;
   said plurality of first selectors selecting branch condition taken/non-taken signals supplied to input terminals of the same position thereamong in accordance with a content of said selecting signal, so that said branch condition taken/non-taken signals of the same content are supplied from said plurality of first selectors to said second selector, when said selecting signal is a predetermined value, and the same branch condition taken/non-taken signal is supplied from said second selector
   the number of said branch condition taken/non-taken signals is greater than the number selected by information of a micro-branch instruction, so that each of said plurality of first selectors receives a signal common to all of said plurality of first selectors and signals inherent to each first selector and not supplied to other first selectors; and
   said second selecting signal is set by the execution of a microinstruction which is different from a micro-branch instruction.

6. A microprogram control apparatus, according to claim 5, wherein:
   said means includes first and second registers; and
   said selecting signal includes a first selecting signal set in said first register and a second selecting signal set in said second register;
   said first selecting signal set being information of an identifying field in a microinstruction; and said second selecting signal set being designated by the execution of a microinstruction.

7. A microprogram control apparatus, according to claim 5, further comprising:
   a branch condition taken/non-taken decision circuit for supplying said branch condition taken/non-taken signal to said plurality of said first selectors.

8. A microprogram control apparatus, according to claim 7, further comprising:
   a microinstruction memory, in which microprograms are stored, and from which microinstructions are read in accordance with an address selected from an address included in a macroinstruction and a branch destination address;
   a decoder for decoding said microinstructions to provide decoded information including said selecting signal;
   a branch destination address generator for generating said branch destination address in accordance with a branch destination address of said microinstructions and said address of said macroinstruction; and
   an instruction execution unit for carrying out a predetermined calculation in accordance with said decoder information, said instruction execution unit supplying information indicating value and state of each internal resource to said branch condition taken/non-taken decision circuit.

* * * * *